United States Patent
Gaash et al.

(10) Patent No.: US 8,605,323 B2
(45) Date of Patent: Dec. 10, 2013

(54) AUTOMATED IMPOSITION

(75) Inventors: Amir Gaash, Ness Ziona (IL); Ron Banner, Yokneam (IL); Liza Mevzos, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 528 days.

(21) Appl. No.: 12/872,585

(22) Filed: Aug. 31, 2010

(65) Prior Publication Data
US 2012/0050813 A1     Mar. 1, 2012

(51) Int. Cl.
*G06K 15/00*     (2006.01)

(52) U.S. Cl.
USPC ............ 358/1.18; 358/1.2; 358/1.8; 715/210; 715/243

(58) Field of Classification Search
USPC .............. 358/1.18, 1.13, 1.2, 1.8; 348/14.07, 348/715; 355/40; 392/2; 399/84; 715/210, 715/243
See application file for complete search history.

(56) References Cited

U.S. PATENT DOCUMENTS

| | | | |
|---|---|---|---|
| 7,177,045 B2 | 2/2007 | Goel et al. | |
| 2003/0160977 A1* | 8/2003 | Nishikawa et al. | 358/1.2 |
| 2003/0163786 A1* | 8/2003 | Shields | 715/517 |
| 2004/0170415 A1* | 9/2004 | Maeda et al. | 396/2 |
| 2004/0174563 A1* | 9/2004 | Cassidy et al. | 358/1.18 |
| 2005/0057761 A1* | 3/2005 | Sakai et al. | 358/1.2 |
| 2006/0139676 A1* | 6/2006 | Kim | 358/1.13 |
| 2007/0208996 A1* | 9/2007 | Berkner et al. | 715/521 |
| 2008/0123138 A1* | 5/2008 | Banerjee et al. | 358/1.18 |
| 2008/0237963 A1 | 10/2008 | Reichhart | |
| 2008/0266606 A1 | 10/2008 | Huenemann | |
| 2010/0014109 A1 | 1/2010 | Debaere | |

* cited by examiner

*Primary Examiner* — King Poon
*Assistant Examiner* — David S Cammack (57) ABSTRACT

Automated imposition wherein a print job comprises multiple documents, and the documents comprise pages having different dimensions. Pages of different dimensions of the same document may be imposed on a single sheet, and pages of equal dimensions may be lined up in a layer across the sheet, forming a cut line along the layer and across the sheet.

9 Claims, 6 Drawing Sheets

AUTOMATED IMPOSITION

BACKGROUND OF THE INVENTION

Printers often use large sheets of paper for printing multiple pages on one sheet. The large sheets may be cut, folded and/or trimmed to obtain the intended pages. The layouts may be so as to allow simplex or duplex printing. Before printing, the layouts are imposed on the sheet in the correct sequential order that corresponds to the way they should be cut and bound. Software has been developed that arranges pages into cells on a sheet, so that the pages can be easily bound after printing and cutting. After cutting, the non-printed portions of the sheet may be treated as waste material. Sometimes a lot of waste is produced.

In a personalized printing job, each print document contains a unique part of information. In a personalized printing job each print document may be directed to a specific recipient. For example, such document may include a credit and/or debit card bill for a particular person.

Sometimes, differently dimensioned pages are bundled, and sent out as one package or product kit to a recipient. For example, such a package may contain a credit and/or debit card bill, a personalized folder or flyer, and a cover letter containing the recipient's address. Commonly, equally sized pages are grouped into an imposition layout before printing. The equally sized pages are printed on the same sheet. After cutting, the differently dimensioned pages of the same package need to be bundled from multiple sheets. This is not always efficient. Moreover, in case of common production errors such as a paper jam, or missing paper, there is a risk that the wrong pages for different recipients will be bundled together into one package.

BRIEF DESCRIPTION OF THE DRAWINGS

For the purpose of illustration, certain embodiments of the present invention will now be described with reference to the accompanying diagrammatic drawings, in which.

DETAILED DESCRIPTION

In the following detailed description, reference is made to the accompanying drawings. The embodiments in the description and drawings should be considered illustrative and are not to be considered as limiting to the specific embodiment of element described. Multiple embodiments may be derived from the following description and/or drawings through modification, combination or variation of certain elements. Furthermore, it may be understood that other embodiments or elements that are not literally disclosed may be derived from the description and drawings by a person skilled in the art.

Figure 1:
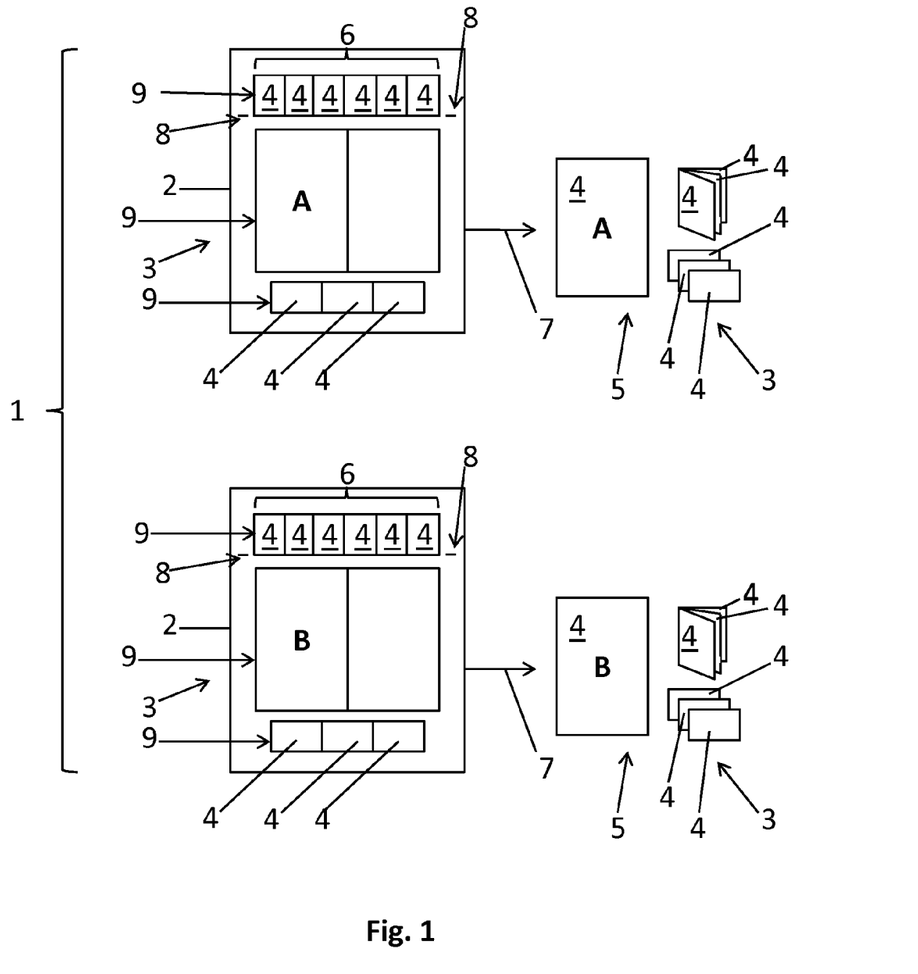
FIG. 1 is a diagram showing an embodiment with two print documents, after printing, and after finishing.

This disclosure relates to an automated method and system for imposing a job 1 on sheets 2. An embodiment of this disclosure relates to imposing a personalized job 1 on sheets 2 in a space and/or time efficient manner. A "job" 1 refers to a print job 1. A job 1 is composed of a number of documents 3 to be printed. FIG. 1 illustrates a simplified example of a job 1 with two personalized documents 3. In practical embodiments, a job 1 may consist of hundreds, thousands or millions of documents 3.

A document 3 consists of a number of layouts 6 and a number of pages 4. In the art, a document 3 may also be referred to as booklet. In this disclosure, a document 3 may refer to both a virtual and a tangible document 3. For example, a tangible document 3 may be a package or bundle 5 of pages. Such package may be bundled in an envelope or a plastic film or the like. In this disclosure, the documents 3 consist of pages 4 having different dimensions. A group of pages 4 of the same size and orientation is called a layout 6. A row or column of pages 4 on the same sheet 2 is referred to as a layer 9.

A layer 9 of pages 4 may extend parallel to a cutline so that the sheet 2 may be cut along a layer 9 of pages 4 in one cut. By arranging the pages 4 in rows or columns throughout the sheet 2, cut lines may be formed along the bottom or top of a respective row, or side of a respective column, respectively. A cut line and/or crop marks may be printed on the sheet 2.

Depending on the particular embodiment, columns may be arranged so that the left or right page edges are parallel to the respective cut line or sheet edge, and rows may be arranged so that either the bottom or the top page edges are parallel to the cut line or sheet edge. When the layers 9 are arranged in columns, the order in which the layers 9 are imposed may be from left to right. When the layers 9 are arranged in rows, the order in which layers 9 are imposed may be from top to bottom.

A sheet 2 may refer to one unit of virtual or tangible print media as it is delivered to a printer. Accordingly, a tangible sheet 2 has two sides and may be printed in simplex or duplex, while a virtual sheet 2 may consist of one face for simplex printing, or two faces for duplex printing. As the method, computer program product and systems explained in this disclosure may apply to both web or sheet presses, it will be understood that a web or sheet can be divided into multiple sheets.

FIG. 1 illustrates a printed job 1, consisting of two documents 3. The virtual job 1 is shown on the left side. The resulting job 1 after a finishing action 7 is shown on the right side. Herein, finishing includes cutting the sheet 2. Furthermore, finishing may include binding, gluing, stapling, folding, etc.

Both the bottom and top documents 3 may contain the same layouts 6, and the finishing of the pages 4 of the documents 3 is the same. However, the documents 3 may be personalized. For example, at least one of the pages 4 may contain specific and/or unique information, such as a name and/or address.

For illustrative purposes, the job 1 of this example consists of two sheets 2. Each sheet 2 contains one document 3. Each document 3 consists of different layouts 6 having specific dimensions. Each layout 6 consists of a group of similarly sized and oriented pages 4. In the shown example, each document 3 has three layouts 6, wherein each layout 6 has different dimensions. In this embodiment, for each document 3, the pages 4 are imposed on a single sheet 2. As can be seen, pages 4 of equal dimensions and orientations are lined up along a cut line of the sheet 2. For illustrative purposes, two ends 8 of a cut line are indicated on the top left sheet 2 of cFIG. 1. In the shown example, the top pages 4 on the sheet 2 form a row along a horizontal cut line, wherein the bottom edges of the pages 4 extend parallel to, or onto, the cut line, or at least onto a straight line that is parallel to the cut line. In other embodiments, the pages 4 of the same layout 6 may be arranged along a vertical cut line, in a column, and the side edges of the pages 4 may be parallel to the cut line. The shown sheet 2 is provided with three rows of pages 4.

In the shown embodiment, the document 3 fits completely on the sheet 2. In other embodiments, multiple sheets 2 may be needed to fit all pages 4 of a document 3. In again another embodiment, multiple documents 3 fit onto one sheet 2.

The shown job 1 is a personalized job 1. Each document 3 within the job 1 comprises a piece of information that is different than the information on the other document 3. For example at least a part of the information on the documents 3 may be adapted to a specific recipient. In the shown example, one document 3 comprises a page 4 with information A, while another document comprises a page 4 with information B. The personalized information may comprise any type of information, for example a specific name, address, bill, advertisement, specific recipient-chosen information, etc.

Figure 2:
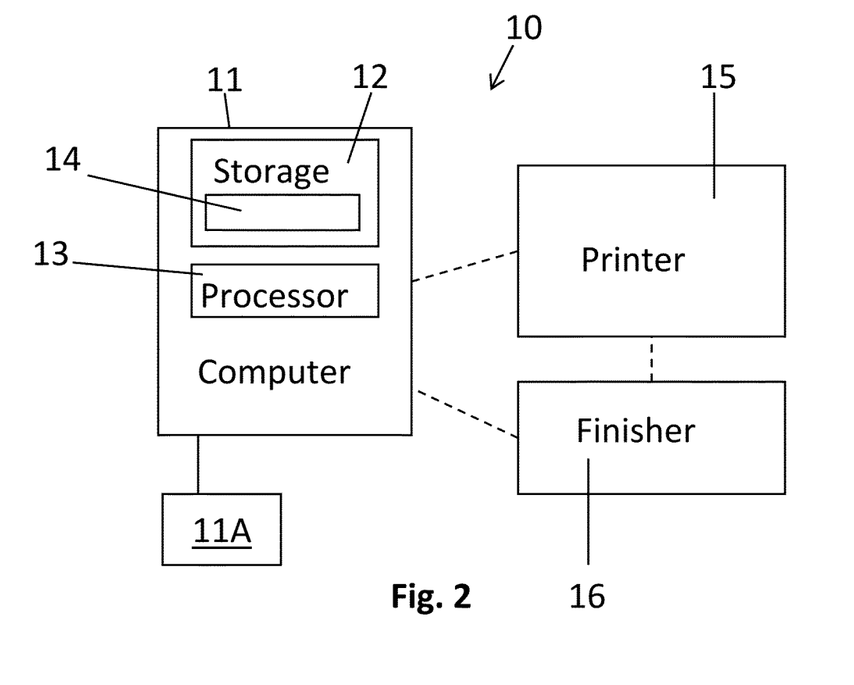
FIG. 2 is diagram of an embodiment of a computer, a printer and a finisher.

FIG. 2 shows an embodiment of an imposition system 10. The imposition system 10 comprises a computer 11. The imposition system 10 comprises a storage device 12. The storage device 12 may be a mobile or fixed storage device 12. The storage device 12 may comprise a non volatile memory, such as a hard disk, and/or may be connected to a distant network connected database or server. The imposition system 10 comprises a processor 13 for executing and calculating according to certain imposition instructions. The instructions may be stored on the storage device 12. The processor 13 may execute preprogrammed instructions as stored on a computer program product 14. The system 10 may comprise a user interface 11A.

The computer program product 14 may be installed on the computer 11. The computer program product 14 may run on a distant computer or server. The computer program product 14 may run from any storage device 12. The computer program product 14 may comprise or form part of a software program. In an embodiment, the computer program product 14 is a part or plug-in of a software product for designing and/or imposing print pages and/or composing personalized jobs.

The imposition system 11 may comprise a printer 15. A digital job 1 that is obtained through the computer 11 can be sent to or otherwise entered into the printer 15 for printing. The printer 15 may be any printer or press, such as a small or large format printer, or an electrophotographic and/or an inkjet printer. In an embodiment, the printer 15 comprises an electrophotographic digital press. This may be convenient since electrophotographic digital presses are suitable for printing personalized jobs of relatively high volumes. In a further embodiment, the printer comprises a liquid electrophotographic digital press.

The imposition system 10 may comprise one or more finishers 16. The finisher 16 may be at least one of a cutter, a stapler, a gluing device, a book binder, a folding machine, a packaging machine, etc. The respective finisher 16 may be connected to the printer 15 and/or to the computer 11. A digital job that is obtained through the computer 11 can be sent to or otherwise entered into the respective finisher 16 for carrying out the respective finishing action.

In an embodiment, the computer program product 14 is configured to instruct the processor 13 to impose the pages 4 of different dimensions on the single sheet 2, the pages 4 pertaining to the same document 3. The pages 4 may form part of at least two differently dimensioned layouts 6. The computer program product 14 is further configured to line up pages 4 with equal dimensions along the respective cut line so that the layer 9 of lined up pages 4 is parallel to said cut line. In the shown embodiment, the bottom edges of the pages 4 extend onto the cut line. In a further embodiment, the processor 13 is configured to impose pages 4 of different dimensions on a single sheet 2, and line up pages 4 with equal dimensions along at least one straight cut line of said sheet 2, so that the respective layer 9 extends parallel to the respective cut line. It is noted that in certain embodiments not shown in this disclosure, the pages 4 may have curved edges, so that the layer 9 is parallel to the cut line but the edges are not entirely arranged on the respective cut line.

Figure 3:
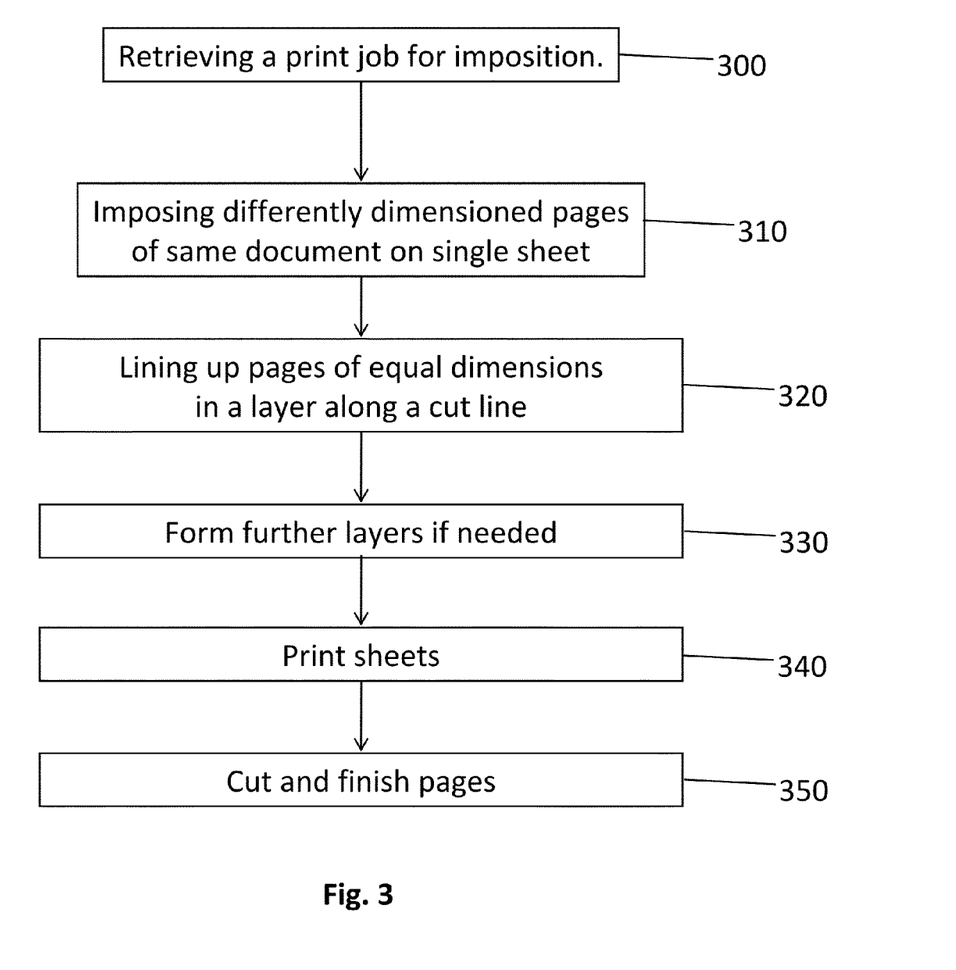
FIG. 3 is a flow chart of an embodiment of an automated imposition method.

FIG. 3 is an embodiment of an automated imposition method. In a first block 300, a print job 1 is retrieved from the storage device 12. The processor 13 retrieves the job 1 to impose the pages 4 on sheets 2. The job 1 may be retrieved from a storage device 12 within or outside of the printer 15. The processor 13 imposes the pages 4 of at least one document 3. Within the document 3, the pages 3 have different dimensions. As indicated by block 310, the processor 13 may impose differently dimensioned pages 4 on one sheet 2. The processor 13 lines up pages 4 of equal dimensions along a cut line. The pages 4 of equal dimensions are lined up so that they form a layer 9, parallel to the respective cut line, as indicated by block 320. The pages 4 of equal dimensions may form a layout 6. If needed, the processor 13 lines up further pages 13 in further layers 9 that may be formed on the sheet 2, as indicated by block 330. When the full document 3 is imposed on one or multiple sheets 2, the job 1 may be sent to the printer 16 for printing the sheets 2, as indicated by block 340. The imposition of the respective document 3 is logically applied to each personalized document 3 of the job 1. After printing, the job 1 may be cut and finished, as indicated by block 350. The sheets 2 are cut along the respective cut lines. Each of above execution steps may be fully or partly automated, or may require manual input.

Figure 4:
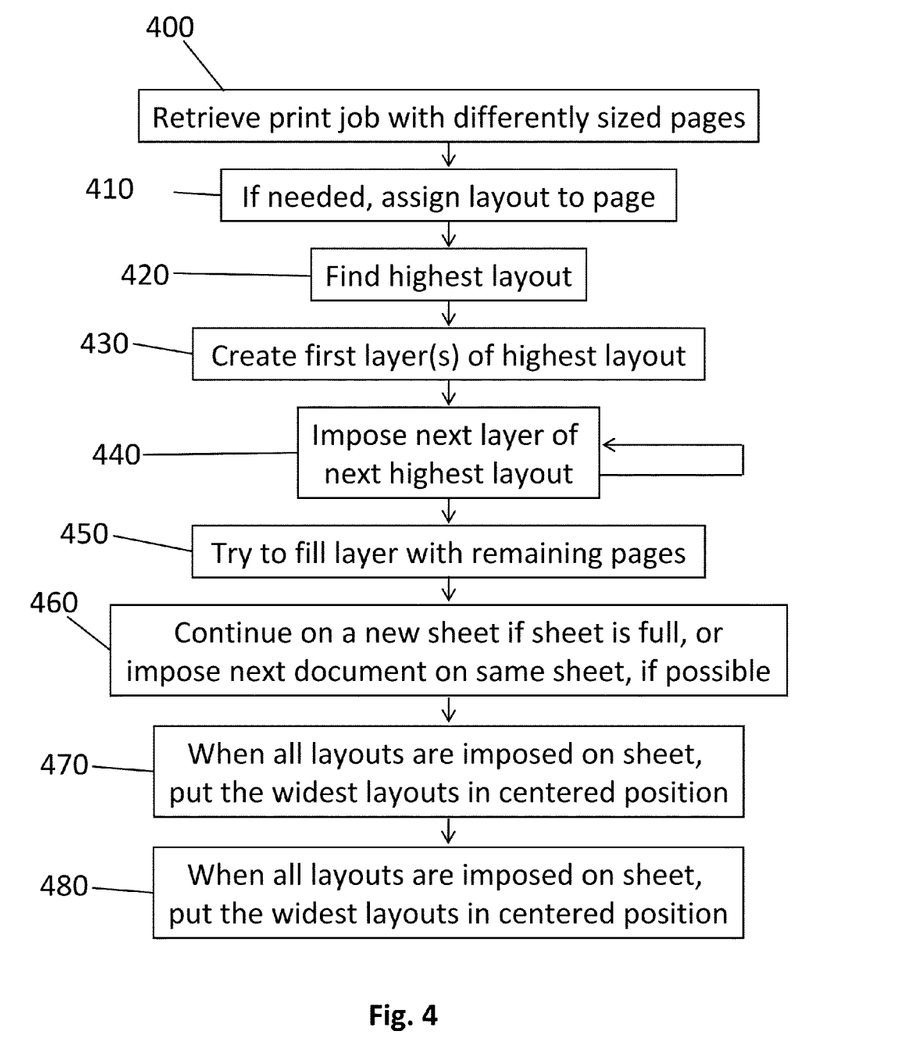
FIG. 4 is a flow chart of a further embodiment of an automated imposition method.

FIG. 4 illustrates a further embodiment of an automated imposition method, wherein a number of cross-sheet cut lines is kept relatively low. At a first block 400, a collection of pages 4 and/or layouts 6 that are to form a document 3 is retrieved. The document 3 comprises layouts 6 having different dimensions. In an embodiment, all pages 4 are grouped to respective layouts 6.

At block 410, Pages 4 that are not assigned to a certain layout 6, are automatically assigned to an existing or a new layout 6. Each layout 6 has only one page size. If a page has no particular size assigned, an available standard size may be chosen. If there is no layout 6 available for the specific page size, in the document 3, a new layout 6 is created. In an embodiment, the new layout 6 is created so that the longest edge extends perpendicular to the respective cut line.

At block 420, a highest layout 6 is selected out of the group of layouts 6 that forms the document 3. In this example, the layouts 6 have predetermined orientations so that the highest layout 6 and next highest layouts 6 can be selected without rotation. Also the layers 9 and cut lines have a predefined orientation, such as horizontal or vertical. As used herein, a highest layout means a layout having the greatest dimension from top to bottom.

In other embodiments, the automated imposition method may allow rotation of the pages 4, for more efficient imposition and/or less cut lines. Note that a layout 6 may include page crop marks.

At block 430, the processor 13 imposes new layers 9 of the pages 4 of the highest layout 6 on the sheet 2. In this way a cut line is formed. New layers 9 may be formed if a further highest page 4 does not fit on the sheet 2 in the same layer 9. New sheets 2 may be used if a new layer 9 does not fit on the sheet 2.

At block 440, a next highest layout 6 may be selected. If space remains in the previously added layer 9 with the highest layout 6, one or more pages 4 of the next highest layout 6 may be imposed in the same layer 9. New layers 9 may be formed if a further one of the next highest page 4 does not fit on the sheet 2 in the same layer 9. New sheets 2 may be used if a new layer does not fit on the sheet 2. The steps of this block 440 may be repeated for a next highest layout 6, in principle until the last layout 6. Pages 4 of decreasing heights may be arranged in the same layer 9 as the preceding pages 4.

For each layer 9, a page 4 of a next layout 6 may be added, before starting a new layer 9 for the next layout 6, as indicated by block 450. When the last layer 9 is imposed on the sheet 2, pages 4 of smaller height may be imposed in one of the already imposed layers 9. In an embodiment, a new sheet 2 may be created when a last sheet 2 is full, as indicated by block 460. In another embodiment, a sheet 2 may be provided with multiple documents. In such embodiment, it may be verified if a full document 3 fits on a portion of a sheet 2, for example half a sheet 2, a third of a sheet 2, etc. If the full document 3 fits on half or a smaller portion of the sheet 2, said portion of the sheet 2 may be treated as a sheet 2, and said steps 420-450 may be repeated for said portion of the sheet 2. This allows the pages 4 to be imposed per document 3. Consequently, the pages 4 may be finished per document 3.

If all layouts 6 are imposed on the respective sheet 2, the layers 9 are rearranged, as indicated by block 470, so that the longest layers 9 are rearranged in a center position. For example, the widest rows or the highest columns may be moved towards a center position on the sheet 2. Also, as indicated by block 480, the layers 9 may be centered vertically, by moving the top offsets. The layers 9 may be centered horizontally, by moving the left offsets.

If one sheet 2 contains multiple documents 3, the layers 9 and/or layouts 6 on the sheet 2 may be grouped by document 3 to allow for relatively efficient finishing of each document 3. The sheet 2 may be divided into multiple sheets portions, each sheet portion containing one document. The steps of blocks 470 and 480 may be executed for each sheet portion.

Figure 5:
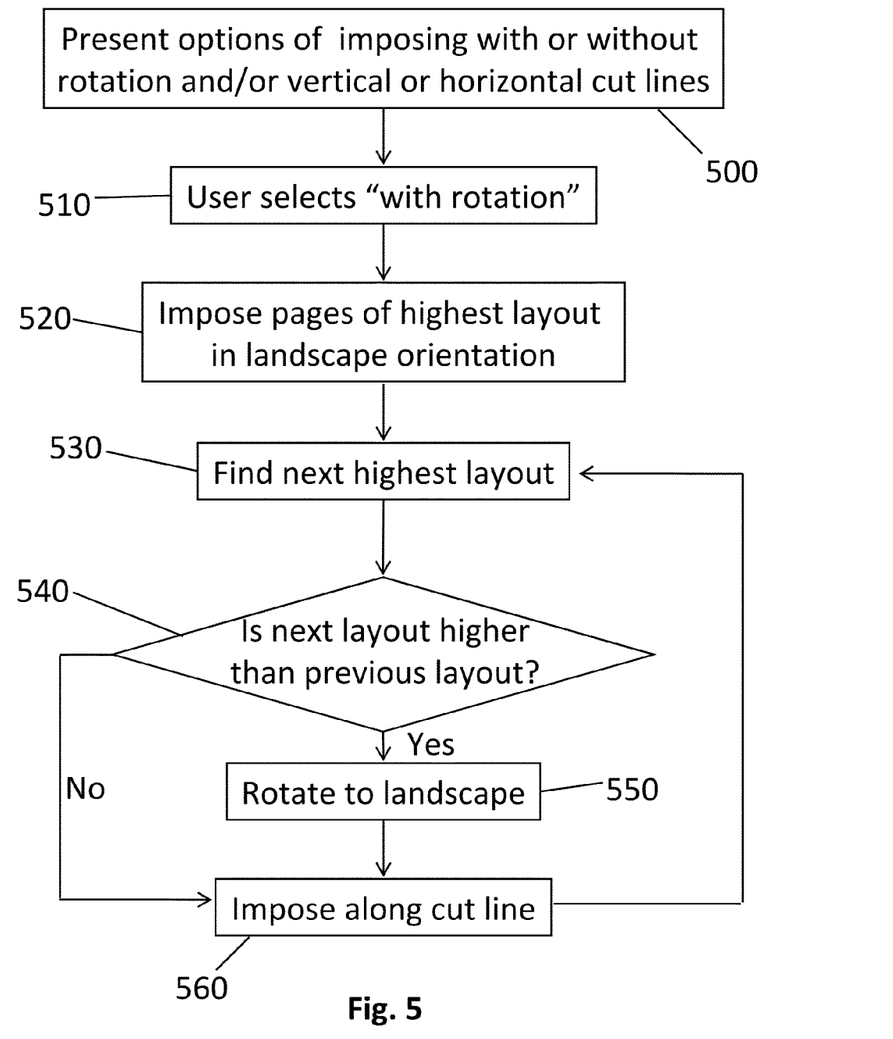
FIG. 5 is a flow chart of a further embodiment of an automated imposition method, wherein an option "with rotation" is selected.

A further embodiment is illustrated in the flow chart of FIG. 5. In this embodiment, the imposition system 10 and the imposition method allow for an auto-rotate option and/or a cut line direction selection, as indicated by block 500. The options may comprise: (i) horizontal guillotine cuts without rotation, (ii) horizontal guillotine cuts with automated rotation, (iii) vertical guillotine cuts without rotation, and (iv) vertical guillotine cuts with automated rotation. If option (i) is selected, the layers 9 are placed in rows while keeping the initial landscape or portrait orientation of the layouts 6. If option (ii) is selected, the layers 9 are placed in rows while allowing the layouts 6 and/or pages 4 to be automatically rotated between a landscape and a portrait orientation. If option (iii) is selected, the layers 9 are placed in columns while keeping the initial landscape or portrait orientation of the layouts 6. If option (iv) is selected, the layers 9 are placed in columns while allowing the layouts 6 and/or pages 4 to be automatically rotated between a landscape and a portrait orientation. The options (ii) and (iv) with automated rotation may allow for more pages 4 to be imposed on the same sheet 2. In an embodiment, full layouts 6 are rotated, not individual pages 4 within each layout.

In an example scenario, the user selects the auto-rotate option, as indicated by block 510. The auto-rotate option may allow for more efficient sheet use and less wasting of media. In this embodiment, the user may select option (ii) or (iv). Then, at a stage in the imposition method that corresponds to block 420 in FIG. 4, the selected highest layout 6 comprises the layout 6 that is the highest in a landscape orientation, as indicated by block 520. When, at a stage corresponding to block 440, a next highest layout 6 needs to be selected, as indicated by block 530, and a next highest layout 6 is higher than the last added layout 6 that has a landscape orientation, the next highest layout 6 is placed in a landscape orientation, as indicated by block 540 and 550. Further layouts 6 and layers 9 may be imposed along the respective cut lines, in rows or columns, as already explained with respect to FIG. 4, and as indicated by block 560. For each layer 9, if a next highest layout 6 is higher than a last added layout 6, it is rotated to a landscape orientation.

Figure 6:
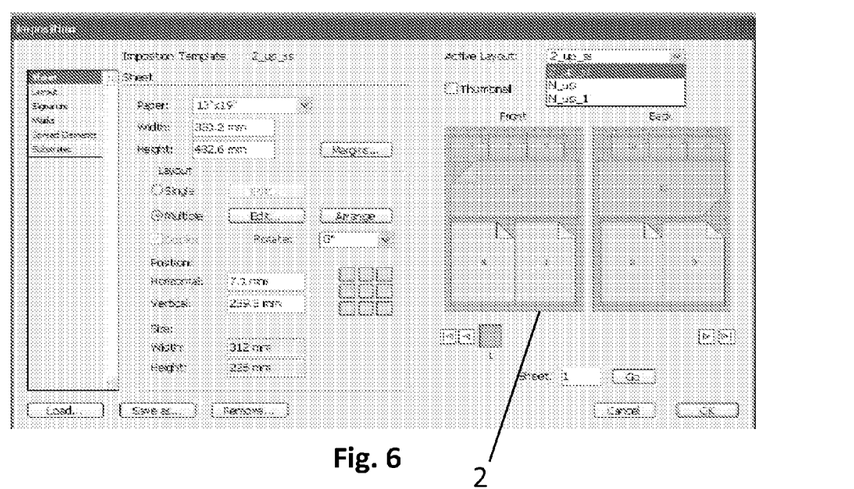
FIG. 6 is an embodiment of a screen shot of a user interface of a computer program product for automated imposition.
Figure 7:
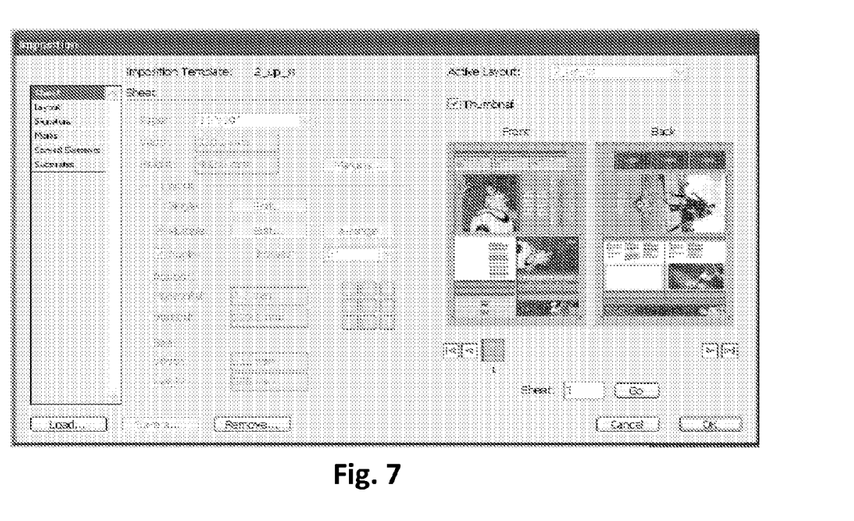
FIG. 7 is an embodiment of a further screen shot of a user interface of a computer program product for automated imposition.

In FIG. 6, an embodiment of a user interface element of the computer program product 14 is illustrated, wherein layout 6 and page 4 properties are indicated. The user interface may illustrate the automatically calculated imposition of a front and back side of a certain sheet 2. In a field called "active layout", a respective layout 6 may be selected, and the properties of the respective layout 6 may be altered. In one embodiment, the user may also overrule the automated imposition by changing the imposition manually. In FIG. 7, the user interface element represents the pages 4 as printouts in thumbnails, representing a further option of the imposition system and method.

The imposition method and program may be arranged so as to allow the user to repeat a certain imposition for each sheet 2 and/or or for each job 1 and/or or for each layer 9 and/or for each layout 6. For example, the user may name and save the respective imposition, so that the executed imposition steps may be repeated for other print jobs that have the same page sizes as the current job. The imposition method allows for the same imposition for each personalized document. For example, in a personalized job 1, personalized information may be linked to the respective information. In an embodiment, when a document is using less than half of the sheet, it can be step-and-repeated, so that more than one document is printed on the same sheet. In such case, the imposition would enable the user to select a certain documents distribution method, to print adjacent document on the same sheet, or to have adjacent documents on different sheets, and to enable the finisher 13 to cut the sheets first, and collate the cut parts one on top of the other. Multiple documents 3 may be placed on one sheet by dividing the sheet 2 into multiple virtual sheets, one for each document 3, and applying the imposition methods as discussed in this disclosure for each virtual sheet. In a further embodiment, when more than one document is printed on a sheet 2, the user interface will give an indication of the distribution order.

Embodiments of the imposition method, system 1 and program 14 prevent mistakes to be made in personalized jobs by printing differently sized layouts 6 of the same document 3 on a sheet 2, instead of printing similar sized layouts 6 of different documents 3 on the sheet. In this way mixing up of pages 4 is prevented and finishing may be made more efficient. Mixing up pages 4 can be a serious problem, for example when printing personal billing or medical information. In addition, the method may allow for a minimum of cut lines per sheet 2. Also, paper waste can be reduced.

The automated imposition proposed here can be applied in certain publishing design and imposition software solutions, for example as a plug-in. In one example, the solution presented here is configured as a plug-in for Adobe® InDesign®. An embodiment simplifies imposition for personalized jobs, while allowing for a secure and efficient way of printing and finishing.

It is further noted that although the above description discloses sheets 2, it is not excluded that the solution may be implemented in web processing printers, such as web presses or liquid electrophotographic digital web presses. For such solutions, a continuous web may be regarded as a multitude of sheets 2.

In one aspect, an automated imposition method may be provided, using a processing circuit 13, and a storage device 12 storing a print job 1 comprising multiple documents 3, the documents 3 comprising pages 4 having different dimensions, comprising (i) imposing pages 4 of different dimensions of the same document 3 on a single sheet 2, and (ii) lining up pages 4 of equal dimensions in a layer 9 across said sheet 2, forming a cut line along the layer 9 and across the sheet 2. In an embodiment, one sheet 2 contains one document 3, or multiple documents 3, or one document 3 covers multiple sheets 2. In a further embodiment, the method comprises imposing pages 4 of a personalized print job 1 comprising personalized documents 3, wherein (i) each document 3 has the same different layouts 6, and (ii) at least a part of the printed information is different for each document 3. In again a further embodiment of an automated imposition method, the pages 4 in a layer 9 have their edges approximately on or parallel to a cut line.

In an embodiment, the method comprises filling up the sheet 2 with lined up pages 4, the sheet 2 having a minimum amount of cut lines. In another embodiment, the automated imposition method comprises (i) selecting a first layout 6 having the highest dimension, (ii) creating a new layer 9 with first pages 4 of the first layout 6, and (iii) if the first pages 4 do not fit in the respective layer 9, creating a new layer 9 for the first layout 6. In a further embodiment, the method comprises (i) selecting a second layout 6 having the next highest dimension, (ii) if at least one of second pages 4 of the second layout 6 fits in a layer 9 with first pages 4, impose the at least one second page 4 in the layer 9, (iii) creating a new layer 9 with second pages 4 of the second layout 6, and (iv) if the second pages 4 do not fit in the respective layer 9, creating a new layer 9. In an embodiment, the automated imposition method comprises filling up a layer 9 or sheet 2 as much as possible with at least one remaining page, for example after a last layer 9 of the sheet 2 is added. In an embodiment, the method comprises creating a new sheet 2 when none of the remaining layouts 6, or pages 4 fits on the sheet 2. In an embodiment, the method comprises arranging the longest layer 9 in a centered position. In an embodiment, the method comprises re-arranging the pages 4 towards a vertical and/or horizontal centre on the sheet 2. In a further embodiment, the automated imposition method comprises, before imposing the pages 2, assigning a layout 6 to pages 4 that have no layout 6 assigned. In again a further embodiment, the automated imposition method comprises an automated rotate option, comprising (i) selecting the layout 6 that is the highest in a landscape orientation, (ii) if a next layout 6 is higher than the highest layout 6, impose the corresponding layouts 6 in a landscape orientation.

In a second aspect, a computer program product 14 may be provided, configured to instruct a processor 13 to (i) impose pages 4 of different dimensions on a single sheet 2, the pages 4 pertaining to the same document 3, and (ii) line up pages 4 with equal dimensions along at least one straight cut line of said sheet 2, forming a layer 9 of pages 4, the layer 9 extending parallel to said cut line.

In a third aspect, a imposition system 10, provided with a storage device 12 storing a print job 1 comprising multiple documents 3, each document 3 comprising pages 4 of different dimensions, and a processor 13, configured to (i) impose pages 4 of different dimensions on a single sheet 2, and (ii) line up pages 4 with equal dimensions along at least one straight cut line of said sheet 2, forming a layer of pages 4, wherein the layer 9 extends parallel to said cut line.

The above description is not intended to be exhaustive or to limit the invention to the embodiments disclosed. Other variations to the disclosed embodiments can be understood and effected by those skilled in the art in practicing the claimed invention, from a study of the drawings, the disclosure, and the appended claims. The indefinite article "a" or "an" does not exclude a plurality, while a reference to a certain number of elements does not exclude the possibility of having more elements. A single unit may fulfill the functions of several items recited in the disclosure, and vice versa several items may fulfill the function of one unit.

In the following claims, the mere fact that certain measures are recited in mutually different dependent claims does not indicate that a combination of these measures cannot be used to advantage. Multiple alternatives, equivalents, variations and combinations may be made without departing from the scope of the invention.

The invention claimed is:

1. A method of automatically imposing pages of a print job for printing using a processing circuit and a storage device storing the print job, the method comprising:

imposing pages of a first document of the iob, sheet wherein:
  the job includes multiple personalized documents;
  each document of the multiple personalized documents includes a plurality of pages;
  at least a part of information to be printed is different for each document;
  the plurality of pages of each document includes at least one page having dimensions different from an other page in the plurality of pages;
  each document is imposed on a single sheet on which no other document is imposed;
  the single sheet corresponds to one unit of print media as the print media is to be delivered to a printer;
  the imposition of each document includes at least one layout;
  a layout consists of a group of pages having the same size and orientation; and
  a layer is a row or column of pages on the same single sheet;
the imposing step including:
  imposing pages of the first document on a first sheet by:
    i) selecting a first layout having the highest dimension;
    ii) creating a first new layer with first pages of the first layout by lining up pages of equal dimensions of the same document of the multiple documents in the layer across the first sheet wherein the pages in the layer have their edges approximately on or parallel to
  a cut line to be formed along the layer and across the first sheet;
    iii) if all of the first pages of the first layout do not fit in the first new layer, creating additional new layers for the first layout until all of the first pages of the first layout are fit into one of the created layers; and iv) repeating the imposition for a next layout having the next highest dimension until all layouts for the first document have been imposed; and imposing pages of a next document on a next new sheet by repeating steps i) through iv), until all of the documents of the job have been imposed.

2. The method according to claim 1 wherein each document has the same imposition.

3. The method according to claim 1, further comprising filling up each sheet with a minimum amount of layers.

4. The method according to claim 1, further comprising arranging the longest layer in a centered position.

5. The imposition method according to claim 1, further comprising re-arranging the pages towards a vertical or horizontal center on the sheet.

6. The method according to claim 1, further comprising, before imposing the pages, assigning a layout to pages that have no layout assigned.

7. The method according to claim 1, comprising:
first, imposing a layout that is the highest in a landscape orientation; and
then, if the next layout is higher than the highest layout, imposing the next layout in a landscape orientation.

8. A computer program product, comprising:
a non-transitory, computer readable medium having embedded therein instructions executable by a processor, the instructions to:
impose pages of a first document of a print job, wherein:
the job includes multiple personalized documents;
each document of the multiple personalized documents includes a plurality of pages;
at least a part of information to be printed is different for each document;
the plurality of pages of each document includes at least one page having dimensions different from an other page in the plurality of pages;
each document is imposed on a single sheet on which no other document is imposed;
the single sheet corresponds to one unit of print media as the print media is to be delivered to a printer;
the imposition of each document includes at least one layout;
a layout consists of a group of pages having the same size and orientation; and
a layer is a row or column of pages on the same single sheet;
the imposing including:
imposition of pages of the first document on a first single sheet by:
i) selecting a first layout having the highest dimension;
ii) creating a first new layer with first pages of the first layout by lining up pages of equal dimensions of the same document of the multiple documents in the layer across the first sheet wherein the pages in the layer have their edges approximately on or parallel to a cut line to be formed along the layer and across the first sheet;
iii) if all of the first pages of the first layout do not fit in the first new layer, creating additional new layers for the first layout until all of the first pages of the first layout are fit into one of the created layers; and
iv) repeating the imposition for a next layout having the next highest dimension until all layouts for the first document have been imposed; and
impose pages of a next document on a next new sheet by repeating steps i) through iv), until all of the documents of the job have been imposed.

9. A system for automatically imposing pages of a print job for printing, comprising:
a storage device to store the print job; and
a processor, to:
impose pages of a first document of the job, wherein:
the job includes multiple personalized documents;
each document of the multiple personalized documents includes a plurality of pages;
at least a part of information to be printed is different for each document;
the plurality of pages of each document includes at least one page having dimensions different from an other page in the plurality of pages;
each document is imposed on a single sheet on which no other document is imposed;
the single sheet corresponds to one unit of print media as the print media is to be delivered to a printer;
the imposition of each document includes at least one layout;
a layout consists of a group of pages having the same size and orientation; and
a layer is a row or column of pages on the same single sheet;
the imposing including:
imposition of pages of the first document on a first single sheet by:
i) selecting a first layout having the highest dimension;
ii) creating a first new layer with first pages of the first layout bylining up pages of equal dimensions of the same document of the multiple documents in the layer across the first sheet wherein the pages in the layer have their edges approximately on or parallel to a cut line to be formed along the layer and across the first sheet;
iii) if all of the first pages of the first layout do not fit in the first new layer, creating additional new layers for the first layout until all of the first pages of the first layout are fit into one of the created layers; and
iv) repeating the imposition for a next layout having the next highest dimension until all layouts for the first document have been imposed; and
impose pages of a next document on a next new sheet by repeating steps i) through iv), until all of the documents of the job have been imposed.

* * * * *

UNITED STATES PATENT AND TRADEMARK OFFICE
CERTIFICATE OF CORRECTION

PATENT NO. : 8,605,323 B2  
APPLICATION NO. : 12/872585  
DATED : December 10, 2013  
INVENTOR(S) : Amir Gaash et al.

Page 1 of 1

It is certified that error appears in the above-identified patent and that said Letters Patent is hereby corrected as shown below:

In the Claims:

In column 8, line 32, in Claim 1, delete "iob, sheet" and insert -- job, --, therefor.

In column 9, line 13, in Claim 5, before "method" delete "imposition".

In column 10, line 41, in Claim 9, delete "bylining" and insert -- by lining --, therefor.

Signed and Sealed this  
First Day of April, 2014

Michelle K. Lee  
*Deputy Director of the United States Patent and Trademark Office*